United States Patent [19]

Olschewski et al.

[11] 4,278,307
[45] Jul. 14, 1981

[54] CAGE FOR A ROLLING BEARING

[75] Inventors: Armin Olschewski; Heinrich Kunkel, both of Schweinfurt; Manfred Brandenstein, Aschfeld; Rainer Schurger, Schwanfeld, all of Fed. Rep. of Germany

[73] Assignee: SKF Kugellagerfabriken GmbH, Schweinfurt, Fed. Rep. of Germany

[21] Appl. No.: 919,364

[22] Filed: Jun. 26, 1978

[30] Foreign Application Priority Data

Jul. 13, 1977 [DE] Fed. Rep. of Germany ....... 2731584

[51] Int. Cl.³ .......................................... F16C 33/41
[52] U.S. Cl. .................................................. 308/201
[58] Field of Search ...................... 308/201, 217–218, 308/235; 29/148.4 C

[56] References Cited

U.S. PATENT DOCUMENTS

| 2,146,440 | 2/1939 | Pew | 308/201 |
| 4,126,362 | 11/1978 | Hamblin et al. | 308/201 |

FOREIGN PATENT DOCUMENTS 1370890 10/1974 United Kingdom .................... 308/201

Primary Examiner—Douglas C. Butler
Attorney, Agent, or Firm—Daniel M. Rosen

[57] ABSTRACT

A cage for a rolling bearing has spreadable holding projections defining pockets for receiving rolling elements. In order to inhibit separation of the rolling elements from the cage after insertion of the rolling elements between the holding projections, the cage has deformable or spreadable cage portions positioned to be spreadable or deformed after insertion of the rolling elements in the cage, for supporting the adjacent holding projections against movement away from the adjacent rolling elements.

16 Claims, 9 Drawing Figures

CAGE FOR A ROLLING BEARING

BACKGROUND OF THE INVENTION

This invention relates to a rolling bearing cage with pockets for receiving the rolling elements, such as balls or rollers, in which the rolling elements are held by holding projections adapted to be spread apart, and in which the holding projections hold the rolling elements elastically as a result of the use of recesses or the like.

Snap cages of plastic material, with elastic holding projections are already known, wherein the cages may be snapped onto balls without a great amount of exertion. These bearing structures have the disadvantage, however, that the cages may also spring from the bearing structure in the presence of relatively small undesirable forces, so that the bearing can be thereby destroyed.

SUMMARY OF THE INVENTION

It is therefore the object of the invention to provide a rolling bearing cage of the above type, in which the rolling elements may be easily assembled in the cage pockets, but in which the cage can be separated from the rolling elements only with great difficulty.

According to the invention this objective is obtained by providing a structure wherein cage parts having spreadable or deformable portions are provided between the holding projections of adjacent pairs of cage pockets, for bracing the holding projections of the cage after the insertion of the rolling elements.

According to one embodiment of the invention, a pin with an upset head part is provided between each pair of adjacent cage pockets. After the insertion of the rolling bodies, the edge of the head part is spread outwardly to the vicinity of the holding projection or to abut the holding projections.

According to a further embodiment of the invention, a ridge is provided adjacent each holding projection, the ridges being extended up to the vicinity of the respective holding projections after the insertion of the rolling elements, i.e., with their free ends either in the vicinity of the holding projections, or abutting the holding projections.

Further, in accordance with the invention, axially extending slits may be provided between the holding projections, with oppositely directed projections extending therefrom. After the insertion of the rolling elements thes projections are separated from one another either by a clearance or with their ends abutting one another.

BRIEF DESCRIPTION OF THE FIGURES

In order that the invention will be more clearly understood, it will now be disclosed in greater detail with reference to the accompanying drawings, wherein.

DETAILED DISCLOSURE OF THE INVENTION

Figure 1:
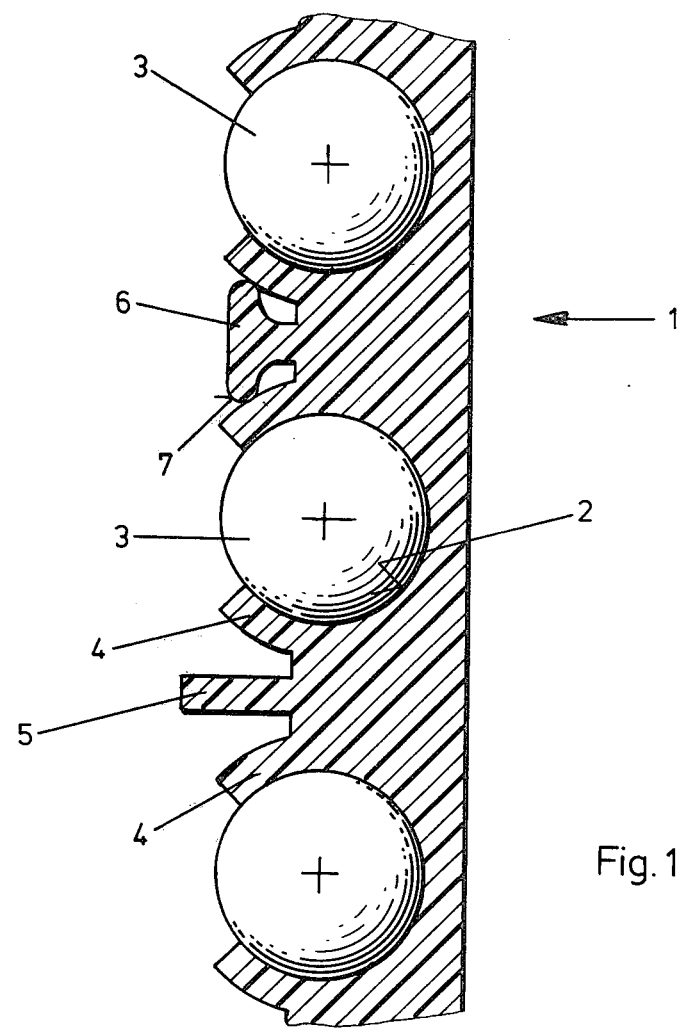
FIG. 1 is a portion of a development of a snap cage of plastic material of the invention, in cross section, in which the holding projections for the rolling elements are held by supplemental deformed pins.

In the following disclosure, similar elements in the drawings are identified by the same reference numerals.

Figure 1A:
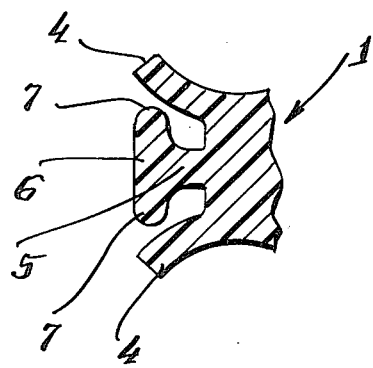
FIG. 1A is a modification of a portion of FIG. 1.

Referring now to FIG. 1, therein is illustrated a planar projection of a snap cage 1, in cross section. The snap cage is of a plastic material, and has concave ball shaped pockets 2 for receiving the balls 3. The pockets have holding projections 4 at the open ends thereof, and the projections 4 are elastically yielding, so that the balls 3 may be snapped into the pockets of the cage without difficulty. In order to prevent the cage 1 from springing from the bearing as a result of adverse forces, spreadable pins 5 are provided between each pair of holding projections 4 of two neighboring cage pockets 2. After the snapping of the cage 1 on the balls 3 the pins are upset to provide head parts 6, the edges of the head parts 6 either engaging the sides of the projections 4 (as illustrated), or being spread therefrom by a small clearance space as shown in FIG. 1A. In this manner the holding projections 4 are fixed in their positions, so that the problem of bells falling out of the cages from the bearing is avoided with assurance. It is important that the head parts 6 not be deformed so far as to abut the holding projections 4, in order to avoid rigid clamping of the balls in the cage pockets by the pressing of the head parts 6 on the holding projections 4.

Figure 2A:
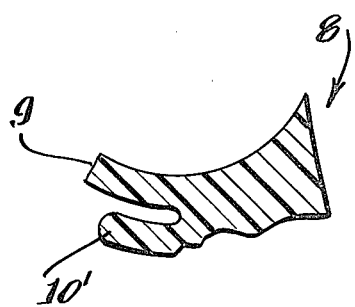
FIG. 2A is a modification of a portion of FIG. 2.
Figure 2:
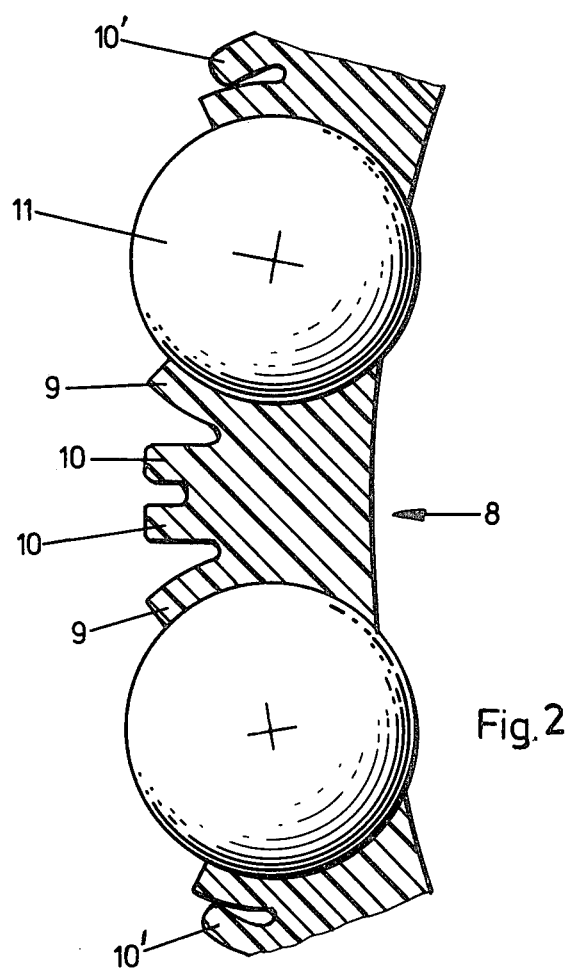
FIG. 2 is an illustration of a portion of a cage for a radial cylindrical roller bearing, in cross section, with spreadable portions, which are deformed after the insertion of the cylindrical rollers and serve to ensure the holding action of the projections.

In the arrangement of the invention illustrated in FIG. 2, the cage is shaped to receive cylindrical rollers, for use in a radial cylindrical roller bearing. Close to each holding projection 9, a radially outwardly directed projection 10 is provided. These projections are deformed ultrasonically, as shown at 10'; following the insertion of the cylindrical roller 11 in the cage pocket, so that the free ends of the deformed projections 10' either extend to the vicinity of the holding projections 9, as shown in FIG. 2A or abut the holding projections 9, to thereby support the holding projections 9.

Figure 3A:
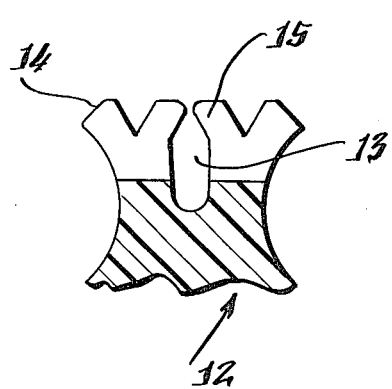
FIG. 3A is a modification of a portion of FIG. 3.
Figure 3:
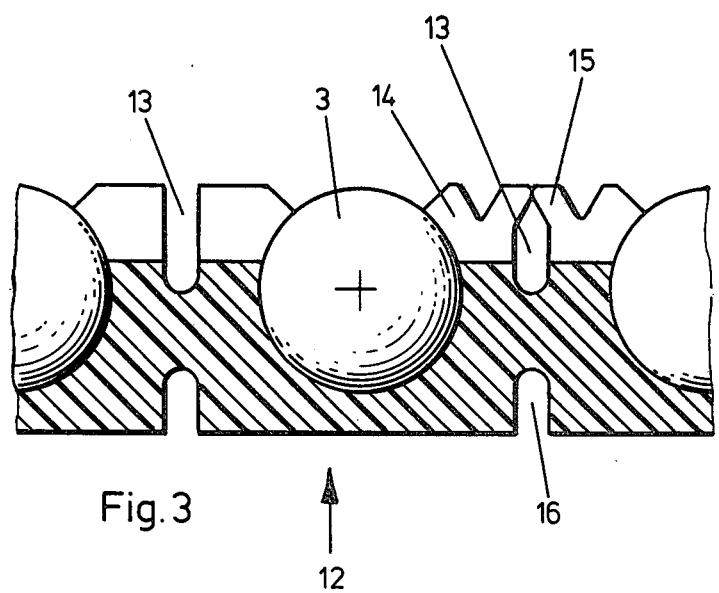
FIG. 3 is a partial view of a development of the snap cage of the invention, in cross section, with slits on the ribs, which are closed by the support projections.
Figure 4:
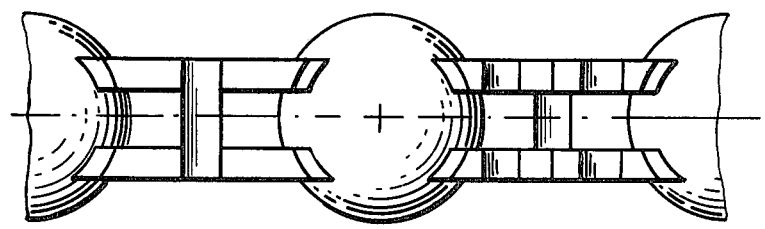
FIG. 4 is a view of the cage of FIG. 3, in the direction of the facing ends of the ribs.

In the embodiment of the invention illustrated in FIGS. 3 and 4, the snap cage 12 is provided with axially running slits 13 extending from the facing surfaces of the ribs, so that the holding projections 14 are separated from one another between adjacent pairs of balls 3. After the snapping of the cage 12 on the balls 3, projections 15 are formed outwardly from the ribs and are so bent that either a clearance exists between their free ends (as shown in FIG. 3A), or that they abut one another with their free ends (as shown in FIG. 3), to brace the holding projections 14. The further advantage arises tha recesses 16 may be provided extending from the back of the cage so that the cage 12 is thereby elastically yielding. These recesses can likewise be closed after the assembly of the cage 12, by suitable or appropriate means.

Figure 5A:
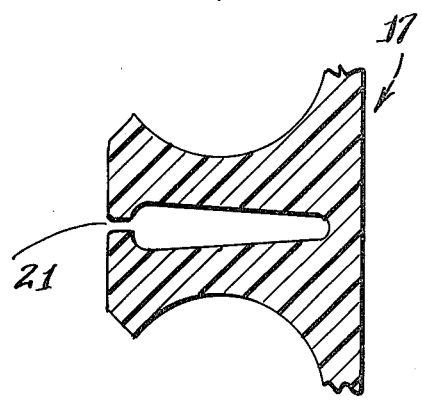
FIG. 5A is a modification of FIG. 5.
Figure 5:
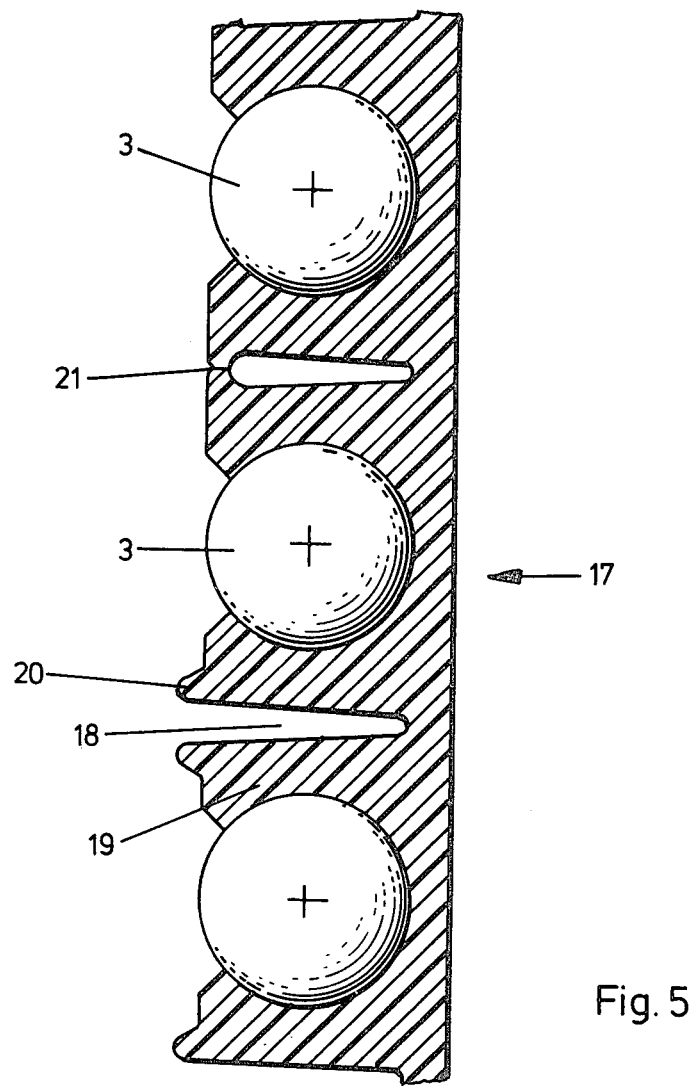
FIG. 5 is an illustration of a part of a development of a glass fiber strengthened snap cage of plastic material, in which the holding projections of two adjacent cage pockets are braced by ultrasonically deformed projections.

The cage 17 according to FIG. 5 has a shape which is especially adaptable for a snap cage of glass fiber reinforced plastic. The cage ribs in this embodiment are provided with especially deep axially extending slits 18, so that the holding projections 19 of a cage of relatively hard plastic material can be elastically sprung over the balls 3. A projection 20 is provided on each side of the slit 18 of each web, after the the assembly of the cage 17, these projections 20 are ultrasonically deformed to so extend into the slits 18 either with their ends spaced only a short distance from one another, as shown in FIG. 5A, or with their ends abutting one another as shown in FIG. 5. In this manner movement of the projections 19 in a circumferential direction is limited, and the cage is held in the bearing with assurance.

In the above disclosure of the invention, it will be apparent that FIGS. 1, 2, 3, 4 and 5 each show the bearing cage under two conditions, i.e., with the respective holding projections not supported by the supporting projections, and with the supporting projections engaging the holding projections after insertion of the rolling elements. For example only, the unheaded pin 5 in the lower portion of FIG. 1 shows the state of this pin after the insertion of the rolling elements, but before the deformation thereof to provide the head 6, as shown in the upper portion of this figure.

It will further be apparent that the deformation of the support projections may be effected by any conventional technique, for example, by heating of the cage to soften the material thereof, and the pressing of a suitably shaped tool on the cage to effect the deformation or displacement of the supporting portion of the cage.

The above-described embodiments constitute only a few examples of the rolling bearing cage according to the invention. Changes in the construction of the individual components are possible within the scope of the invention. For example, in the embodiment of the invention illustrated in FIG. 5, the illustrated slits 18 in the elastic cage material may alternatively be of less depth. Further, the play between the deformed cage parts and the holding projections can be sufficiently large that the snapping out of the cage is just hindered.

What is claimed is:

1. In a rolling bearing cage with pockets for receiving rolling elements, in which the rolling elements are held by spreadable holding projections, the holding projections being elastic and having recesses for receiving the rolling elements the improvement comprising spreadable cage portions on said cage between the holding projections of pairs of adjacent cage pockets said cage portions being positioned to be spreadable to positions for supporting the adjacent holding projections of the cage after the insertion of the rolling elements, to inhibit separation of said cage from said rolling elements.

2. The rolling bearing cage of claim 1 wherein said cage portions comprise support projections extending into axially extending slits of the cage, the support projections being displaceable after the insertion of the rolling elements, to provide clearance between adjacent support projections.

3. The rolling bearing cage of claim 1 wherein said cage portions comprise support projections extending into axially extending slits of the cage, the support projections being displaceable after the insertion of the rolling elements, to abut adjacent support projections.

4. The rolling bearing cage of claim 1 wherein said cage portions comprise support projections extending into axially extending slits between the holding projections of the cage, the support projections being displaceable after the insertion of the rolling elements to abut one another with their ends.

5. The rolling bearing cage of claim 1 wherein said cage portions comprise support projections extending into axially extending slits between the holding projections of the cage, the support projections being displaceable after the insertion of the rolling elements to be separated from one another by a small clearance.

6. The rolling bearing cage of claim 1 wherein said cage has axially extending recesses between the cage pockets on the side thereof opposite said holding projections.

7. The rolling bearing cage of claim 1 wherein the cage has a separate deformable support projection adjacent each holding projection, the free ends of said support projections backing up the respective adjacent holding projections with clearance after the insertion of the rolling elements.

8. The rolling bearing cage of claim 1 wherein the cage has a separate deformable support projection adjacent each holding projection, the free ends of said support projections backing up the respective adjacent holding projections and abutting said adjacent holding projections after the insertion of the rolling elements.

9. In a rolling bearing cage with pockets for receiving rolling elements, in which the rolling elements are held by spreadable holding projections, the holding projections being elastic and having recesses for receiving the rolling elements the improvement comprising spreadable cage portions on said cage between the holding projections of pairs of adjacent cage pockets said cage portions being positioned to be spreadable to positions for supporting the adjacent holding projections of the cage after the insertion of the rolling elements, to inhibit separation of said cage from said rolling elements, said cage portions between two adjacent cage pockets comprising pins having upset head parts, the upset head parts extending toward the adjacent holding projections after the insertion of the rolling elements.

10. The rolling bearing cage of claim 9 wherein said head parts abut said holding projections after insertion of said rolling elements.

11. The rolling bearing cage of claim 9 wherein said upset head parts are spaced from adjacent holding projections with clearance after insertion of said rolling elements.

12. In a rolling bearing cage having pockets for receiving rolling elements, in which the rolling elements are held by spreadable holding projections extending from portions of the cage intermediate said pockets, said holding projections being elastic and having recesses for receiving the rolling elements; the improvement further comprising projection means extending from the portions of said cage between said pockets and having ends positioned to inhibit deformation of said holding projections away from the respective rolling elements they engage, for inhibiting separation of said cage from said rolling elements.

13. The rolling bearing cage of claim 12 wherein said projection means comprise projections extending outwardly from said cage with free ends extending toward the respective holding projections.

14. The rolling bearing cage of claim 12 further comprising axially extending slit means in said cage portions between said pockets, said projection means extending circumferentially of said cage in said slits.

15. In a rolling bearing cage with pockets for receiving rolling elements, in which the rolling elements are held by spreadable holding projections, the holding projections being elastic and having recesses for receiving the rolling elements; the improvement comprising deformable cage portions on said cage between the holding projections of pairs of adjacent cage pockets, said cage portions being positioned to be deformable to positions for supporting the adjacent holding projections of the cage after the insertion of the rolling elements to inhibit separation of said cage from said rolling elements.

16. In a rolling bearing cage with pockets for receiving rolling elements, in which the rolling elements are held by spreadable holding projections, the holding projections being elastic and having recesses for receiving the rolling elements; the improvement comprising deformed cage portions on said cage between holding projections of pairs of adjacent cage pockets, said deformed holding projections being positioned to brace adjacent holding projections thereby to inhibit separation of said cage from said rolling elements.

* * * * *

UNITED STATES PATENT AND TRADEMARK OFFICE
CERTIFICATE OF CORRECTION

PATENT NO. : 4,278,307
DATED : July 14, 1981
INVENTOR(S) : Armin Olschewski, et al It is certified that error appears in the above—identified patent and that said Letters Patent is hereby corrected as shown below:

Column 1, line 50, change "thes" to -- these --.

Column 2, line 34, change "bells" to -- balls --.

Column 2, line 62, change "tha" to -- that --.

Signed and Sealed this

Nineteenth Day of February 1985

[SEAL]

Attest:

DONALD J. QUIGG

Attesting Officer

Acting Commissioner of Patents and Trademarks